United States Patent [19]

Carlisle

[11] Patent Number: 5,416,632

[45] Date of Patent: May 16, 1995

[54] NEWTONIAN BINOCULAR TELESCOPE

[76] Inventor: James H. Carlisle, 611 Luneta, San Luis Obispo, Calif. 93405

[21] Appl. No.: 57,176

[22] Filed: May 4, 1993

[51] Int. Cl.$^6$ .................. G02B 23/06; G02B 23/16
[52] U.S. Cl. .................. 359/399; 359/400; 359/364; 359/404; 359/407
[58] Field of Search .............. 359/399, 400, 404, 407, 359/412, 413, 414, 415, 416, 417, 418, 364

[56] References Cited

U.S. PATENT DOCUMENTS

| | | | |
|---|---|---|---|
| 4,312,560 | 1/1982 | Hale | 350/27 |
| 4,927,252 | 5/1990 | Burr | 359/364 |

OTHER PUBLICATIONS

Hale, Arthur, Gleanings for ATM's article entitled "A 6 Inch Binocular with Tilted Mirrors" Sky & Telescope, Dec. 1979, p. 583.
Sky & Telescope, Jan. 1991, pp. 31 & 33 from "Ten Top Telescope Ideas, 1990".
Amateur Telescope Making, A. Ingalls, Ed. 1933 pp. 440, 441.
Amateur Telescope Making Book Two, 1949, pp. 518, 519.
Astronomy Sep. 1992 p. 24 "Texas Tales & Riverside Report".

Primary Examiner—Eugene R. LaRoche
Assistant Examiner—Huan Hoang

[57] ABSTRACT

A Newtonian binocular telescope (20), which is readily adaptable to popular telescope mounts, such as the Dobsonian mount (76), and which includes two primary mirrors (42a, 42b), and two secondary mirrors (32a, 32b), in a single tube (21) of either solid wall or open frame construction. The single tube (21) allows central secondary optical axes (34a, 34b) to be disposed in laterally and longitudinally separate parallel relation to one another so as to form a comfortable interocular axis (36) between them. Both telescopes' oculars (50a, 50b) are conveniently disposed adjacent an ocular wall (22) on a side of tube (21) nearest one of the telescopes. The viewer is provided easy access (91a, 91b and 92a, 92b) to primary alignment means (87a, 87b), which may be used to merge images between telescopes. Viewer is also provided a convenient means of moving one of the telescopes for interocular adjustment (70, 72), thus permitting the instant invention to be easily and quickly adaptable to multiple users, even as a large reflecting binocular telescope.

9 Claims, 7 Drawing Sheets

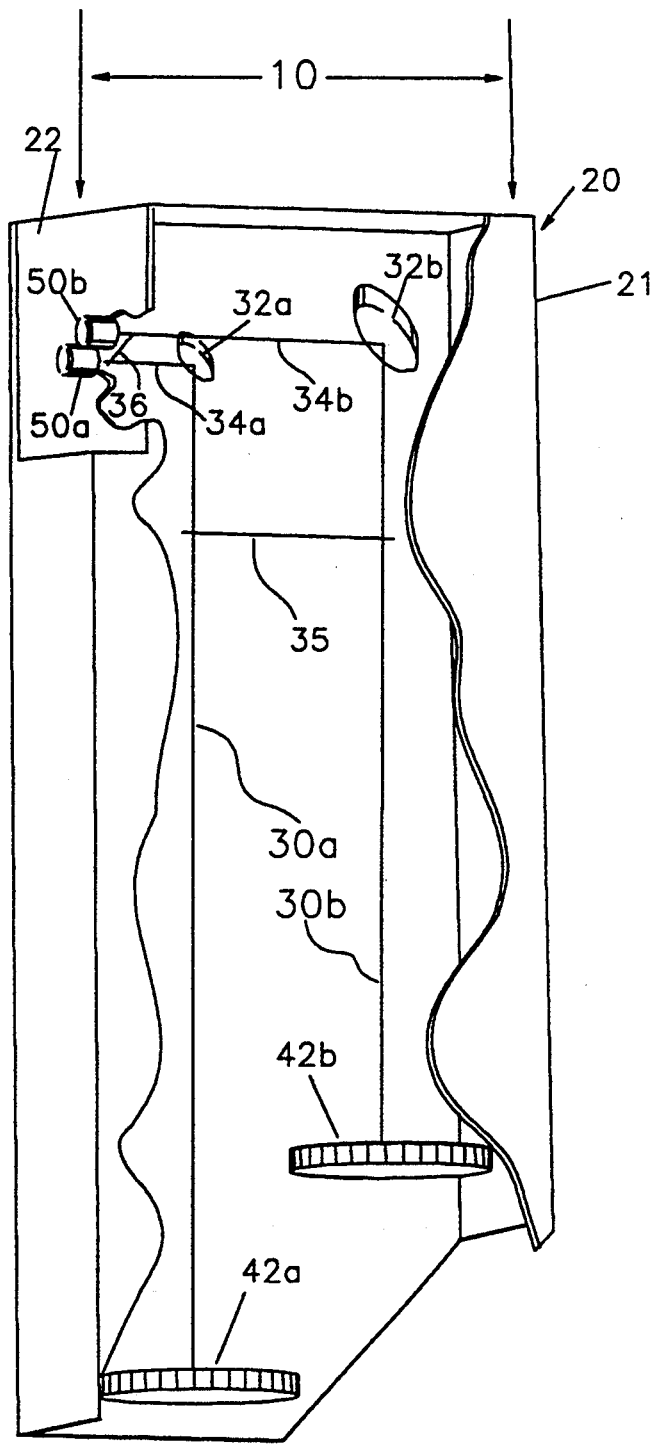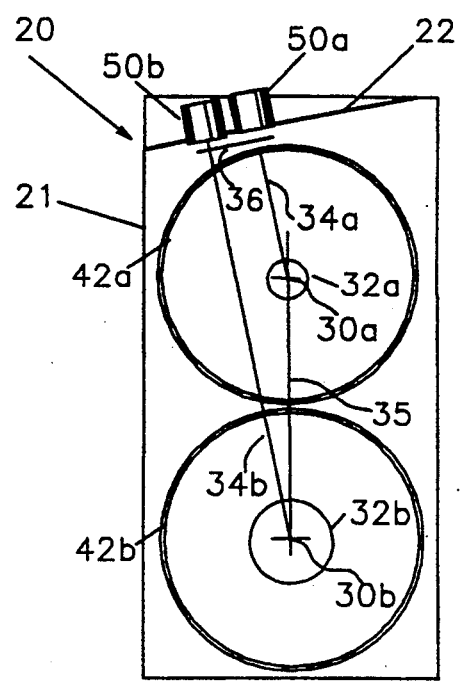
FIG 2A
FIG 2B

NEWTONIAN BINOCULAR TELESCOPE

BACKGROUND OF THE INVENTION

The invention relates to telescopes in general, and in particular to Newtonian reflecting binocular telescopes.

BACKGROUND—DISCUSSION OF PRIOR ART

Heretofore, Newtonian binocular telescopes were not common, because of the uncomfortable interocular axis, especially at Zenith attitudes. Newtonian binocular telescopes which use tertiary mirrors to bring the oculars together between the tubes require the tertiary-ocular axes to be parallel to the primary axes in order for the images of both telescopes to match. Thus, the viewer stands between the upper ends of the telescope tubes, which tends to introduce disturbing heat currents into the light path from the viewer's body, as well as confusing "pseudo-scopic" images from the tertiary mirrors. The viewer's head becomes more uncomfortable as the tube approaches zenith attitudes.

Sir John Herschel is attributed with having placed two Newtonian telescopes, side by side, the oculars of both telescopes lying along the side of one telescope opposite the second telescope. Holes were cut on both sides of the first tube, to allow the secondary rays, from the more distant second telescope, to pass through, to it's ocular. The more distant telescope's concave mirror is disposed nearer its respective secondary mirror, in order to allow the second telescope's secondary focus to reach a common secondary focal plane with the first telescope. However, the telescope went into immediate oblivion, where it remained for the past 150 years, primarily because of its uncomfortable interocular axis: As the telescope approaches zenith attitude, the viewer's head must tilt sideways, until it is uncomfortably horizontal.

In U.S. Pat. No. 4,312,560 (1982), Hale uses off-axis mirrors to direct the focus near the inside edge of the tubes, and up therefrom to oculars. By arranging the oculars in an oblique axis, the viewer is allowed to stand at the side of the telescope, as in a normal Newtonian. Off-axis primary mirrors are very difficult and expensive to figure.

Hale's patent works only with off-axis telescopes, not with Newtonian telescopes: In Newtonian telescopes, the symmetrical parabolodial mirrors require the diagonal reflectors be disposed along the central axis of the tube at its outer end to intersect its converging rays of light. In order to use two Newtonian telescopes as binoculars, a third mirror must be placed between the tubes near each ocular. If the tertiary-ocular axis is placed in any position other than parallel to the axis of the tube, the image of one ocular rotates opposite the image in the other. Therefore, it is not possible to place oculars of two Newtonian telescopes upward between the tubes, as in the Hale telescope, to allow the viewer to stand to the side.

In the instant invention, a single tube for both telescopes allows the secondary axes to be at an acute angle to the axis intersecting the primary axes, so that the interocular axis may be inclined along a common side of the tube for comfortable binocular viewing at all attitudes of the telescope. The instant invention makes alignment and interocular adjustment means available to the viewer while looking through the oculars to more easily make these adjustments while viewing the images. Large astronomical reflecting telescopes, especially binocular telescopes, should have such devices to reduce the frustrating trips from the oculars to the primary mirrors. The prior art shows a lack of such devices for conveniently aligning binocular images in large astronomical reflecting telescopes, while the viewer observes the images at the oculars.

Also, the instant invention's single tube has the advantage of common structural elements, which helps to devise means of mutual alignment and interocular adjustment between the telescopes. Separate tubes in the telescopes cited above are awkward to mount to telescope bases, and to devise a means of alignment and interocular adjustment. The single tube is also much easier to mount to telescope mountings, especially to Dobsonian, and alt-azimuthal mountings.

DRAWING FIGURES

FIGS. 2A and 2B show diagrammatic perspective and front views of preferred embodiment of the instant invention with tube pointed at zenith.

Figure 1A:
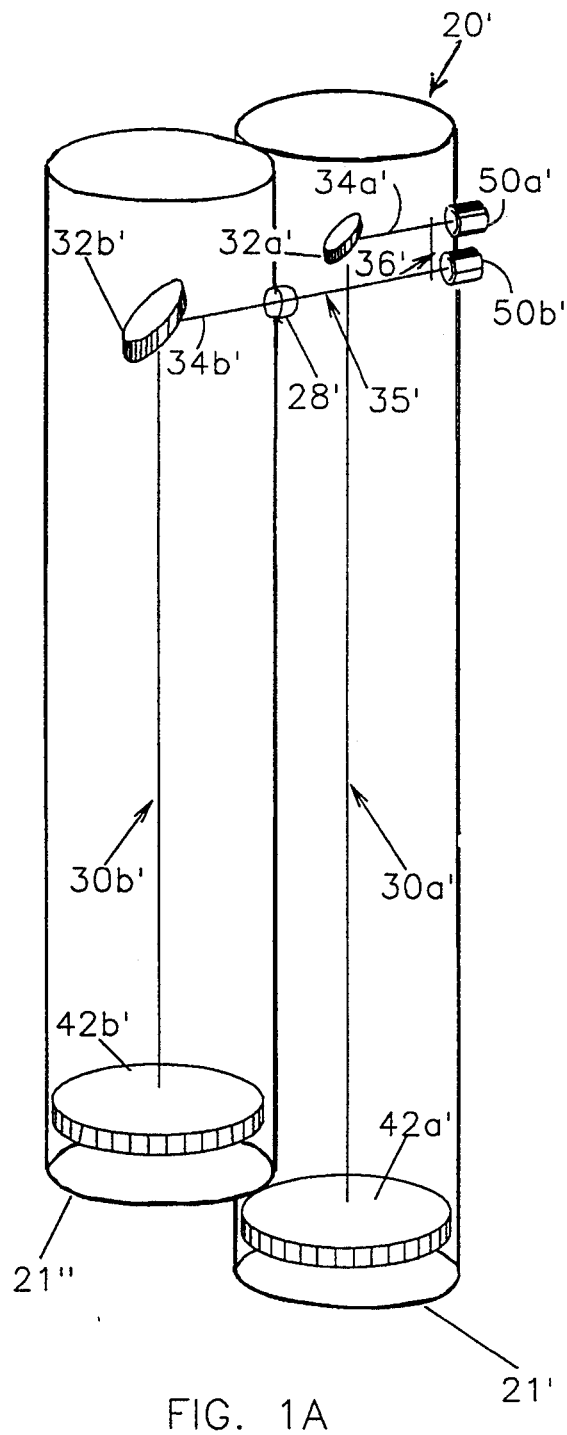
FIGS. 1A and 1B show a diagrammatic perspective and front views of Sir John Herschel's Newtonian Binocular Telescope with tubes pointed at zenith.

| Reference Numerals in Drawings | |
|---|---|
| 10 Entering ray | 80 Mount Base |
| 20 Optical tube assembly | 82 Twin lever arm |
| 21 Tube | 84 Pivot pin |
| 22 Ocular side | 85 Primary mount fulcrum bolt |
| 23 Elongated focuser slot | 87 Primary alignment bolts |
| 28 Common secondary junction | 91 Alignment extension rod |
| 30 Central primary optical axis | 92 Extension rod handle |
| 32 Secondary mirror | Suffixes in Drawing Figures |
| 34 Central secondary optical axis | ..a Re moveable telescope |
| 35 Transverse axis | ..b Re fixed telescope |
| 36 Interocular axis | |
| 41 Primary tube slots | |
| 42 Primary mirror | |
| 45 Primary mount | |
| 46 Fixed fulcrum brace | |
| 47 Primary mount brace | |
| 49 Secondary holder-spider | |
| 50 Focuser-Ocular | |
| 52 Focuser carriage | |
| 53 Guide rod hole-bushing | |
| 54 Front end tube brace | |
| 55 Tube brace | |
| 56 Rear end tube brace | |
| 61 Loading spring | |
| 63 Washer | |
| 65 Threaded hole-bushing | |
| 67 Stop nut or clip | |
| 68 Glide rod | |
| 70 Twin lever | |
| 72 Lever handle | |
| 74 Altitude bearing | |

| | |
|---|---|
| 76 | Dobsonian Mount |
| 78 | Mount Cradle |

DETAILED DESCRIPTION—FIGS. 1A–7B

Figure 1B:
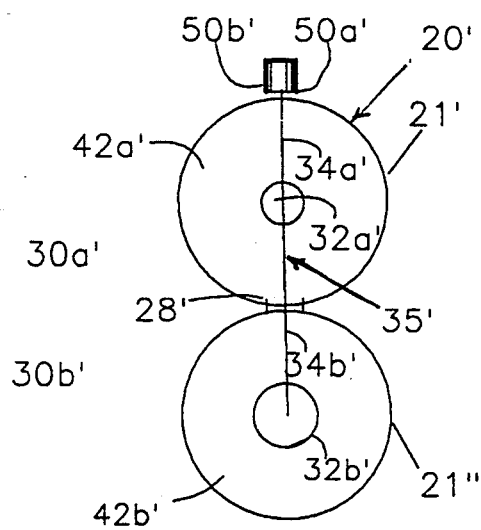

FIGS. 1A and 1B show diagrams of perspective and front, or outer end, views of Sir John Herschel's Newtonian binocular telescope, respectively, for purposes of comparison with FIGS. 2A, and 2B, which are diagrams of perspective and front, or outer end, views of preferred embodiment of the instant invention. Primed numbers are used in FIGS. 1A and 1B, in order to distinguish between commensurate parts of instant invention and the Herschel telescope.

In the Herschel binoculars, two generally similar telescopes are disposed side by side, a transverse axis 35' intersecting their respective central primary optical axes 30a', 30b'. Separate tubes 21', 21" enclose each telescope, constraining central secondary optical axes 34a', 34b', to conform to transverse axis 35', which intersects tubes 21', 21", at a common secondary junction 28'. The resulting interocular axis 36' formed adjacent focuser ocular 50a', 50b', between central secondary optical axes 34a', 34b', is parallel to the telescope's longitudinal axis, and thus predisposed in an uncomfortable vertical relation when the telescope is pointed at zenith, as shown in FIG. 1A.

As shown in FIGS. 2A and 2B, in the instant invention, both telescopes share a common tube 21, which may be of solid wall or open frame construction. Hereinafter, each telescope in tube 21 shall be referred to as a telescope. Central secondary optical axes 34a, 34b, are disposed about their respective central primary optical axes 30a, 30b, at an acute angle to transverse axis 35, so as to laterally separate said central secondary optical axes 34a, 34b, thereby forming a comfortable sloping interocular axis 36 between them, adjacent focuser ocular 50a, 50b.

The two telescopes must be of generally equal focal lengths, and therefore the fixed telescope's primary mirror 42b must be disposed nearer its respective secondary mirror 32b by a distance which is inversely proportional to the greater distance between its respective central primary optical axis 30b, and ocular 50b, along central secondary optical axis 34b, than the distance between commensurate points, 30a-50b, in the nearer moveable telescope. Ocular side 22 is inclined between adjacent sides so that it is perpendicular in all polar relations to central secondary optical axes 34a, 34b, thereby providing an alignment reference surface for mounting focuser-oculars 50a, 50b.

Figure 3:
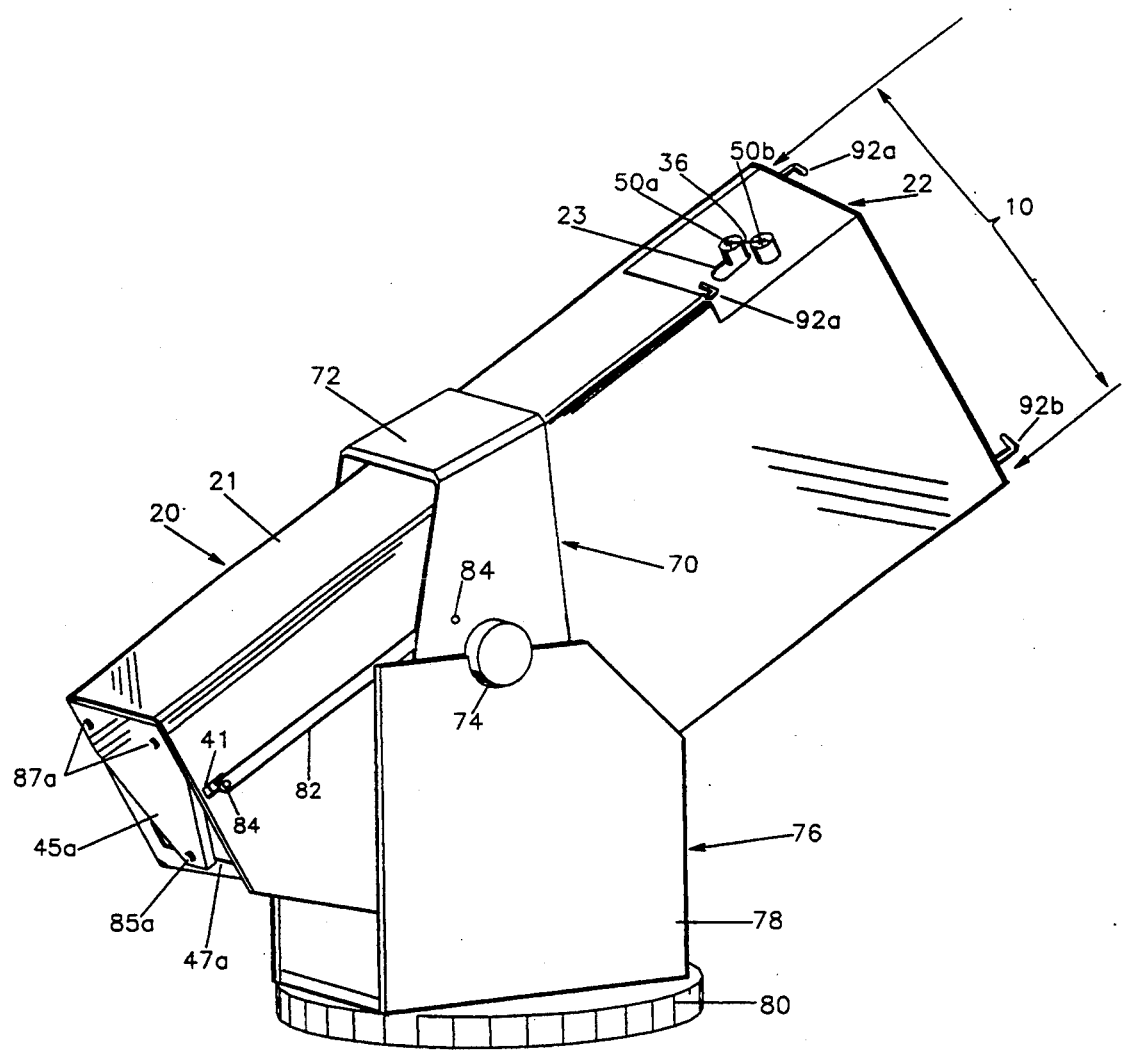
FIG. 3 shows a perspective view of vertical embodiment of the instant invention, with lever, and Dobsonian mount.
Figure 4:
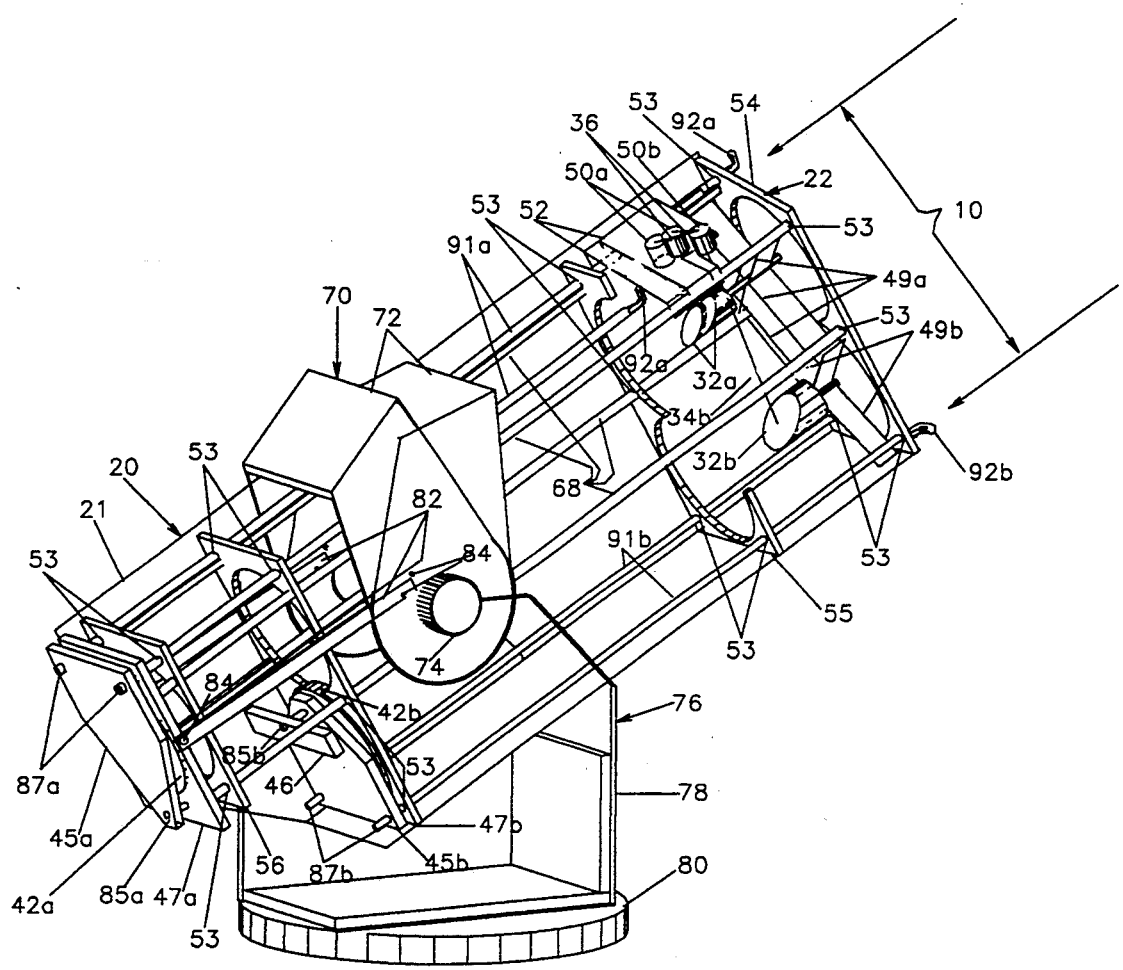
FIG. 4 shows cutaway perspective view of vertical embodiment of the instant invention, with optics, braces and moveable telescope shown in extreme forward and rearward positions.

FIGS. 3 and 4 are the same perspective views of vertical embodiment of the instant invention. However, FIG. 4 shows the internal parts of the telescope with the near side of tube 21 and Dobsonian mount 76 removed.

Parts designated with suffix "b", are components of instant invention's fixed telescope. Fixed telescope's primary mount brace 47b, secondary holder-spider 49b, ocular focuser 50b, and fixed fulcrum brace 46 are affixed to the tube 21.

Figure 5:
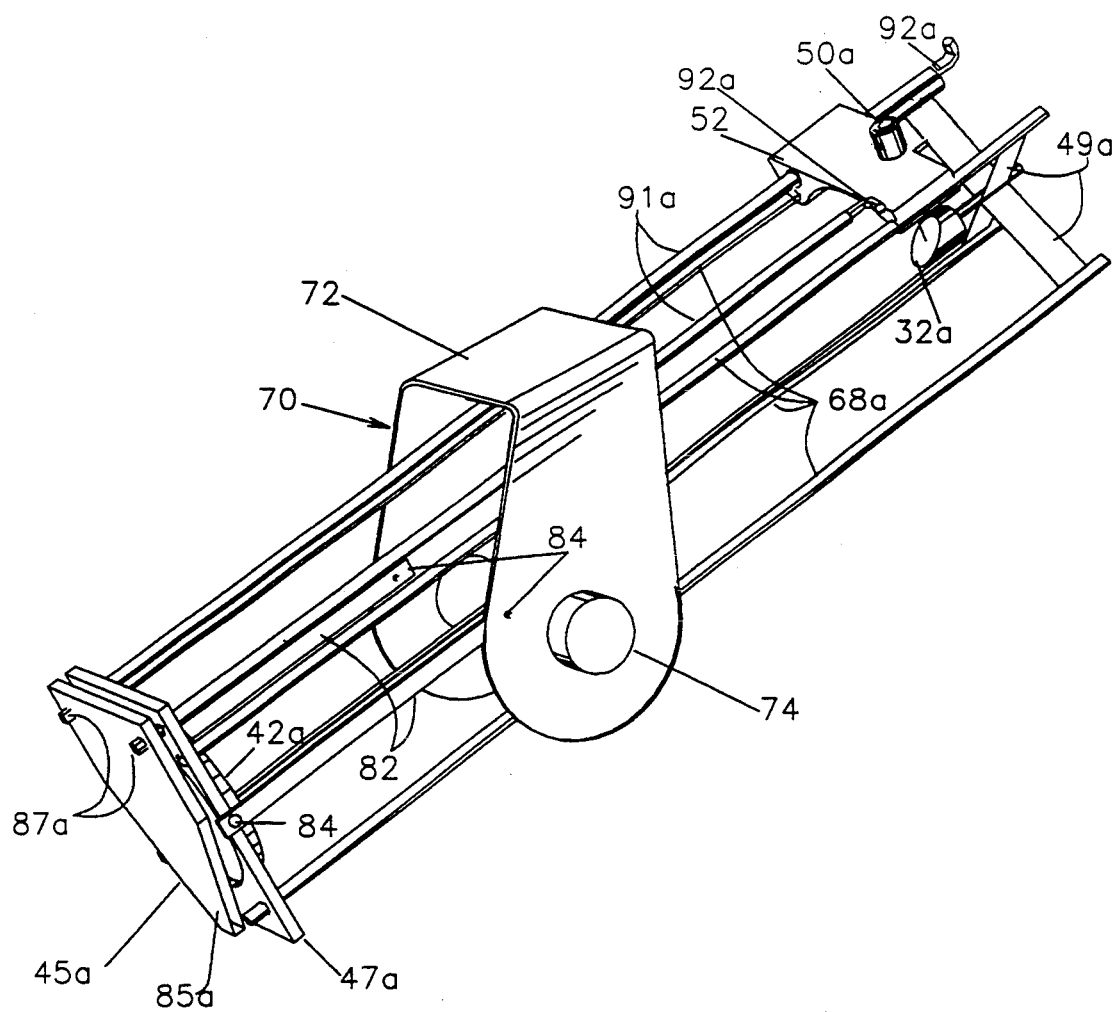
FIG. 5 shows a detail of longitudinally adjustable moveable telescope in the preferred embodiment.

FIG. 5 shows longitudinally moveable telescope. Parts for moveable telescope are designated with the suffix "a", and are rigidly held together by means of glide rods 68, which are moveable in guide hole-bushings 53 in tube braces 54, 55, 47b, for the purpose of interocular adjustment between both telescopes. Primary mount brace 47a, secondary holder-spider 49a, and focuser carriage 52, are fixed to moveable telescope's glide rods 68. FIG. 4 shows extreme positions of moveable telescope's secondary mirror 32a, ocular 50a, secondary holder-spider vane 49a, focuser carriage 52, lever 70, and lever handle 72.

Figure 6A:
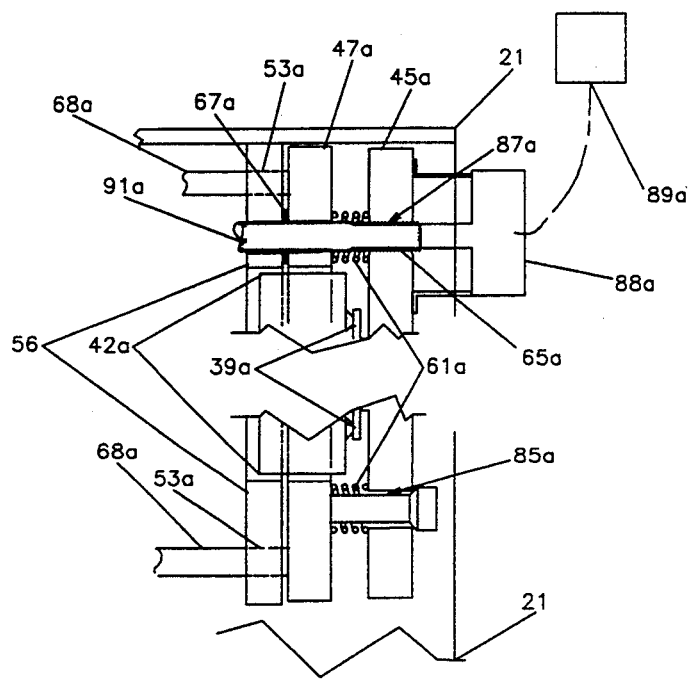
FIGS. 6A and 6B Show concave mirror mount/alignment rods detail.
Figure 6B:
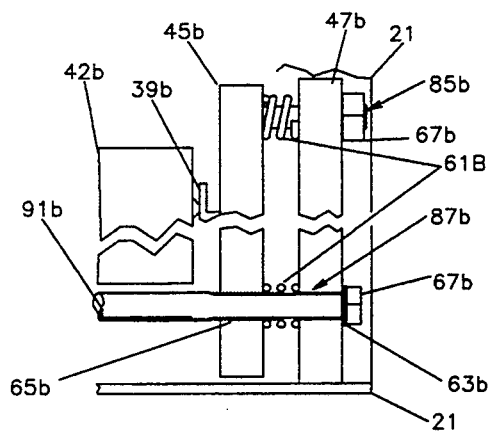

As shown in the details of two separate embodiments of primary mirror mounting means in FIGS. 6A and 6B, primary mounts 45a, 45b, and their respective primary mount braces 47a, 47b, are primary mounting components. In the embodiment shown in FIG. 6A, primary mount brace 47a, and rear end tube brace 56, encircle their respective primary mirrors 42b, 42a, with sufficient clearance to prevent contact. Primary mirrors 42a, 42b, are attached to their respective primary mounts 45a, 45b. In another embodiment of primary mount means, shown in FIG. 6B, primary mirror 42b and primary mount 45b are forward of their respective primary mount brace 47b. Either arrangement may be used in fixed or moveable telescope.

Primary mounts 45a, 45b, are attached to their respective primary mount braces 47a, 47b by primary alignment bolts 87a, 87b and their respective primary fulcrum bolt 85a, 85b, which are parallel to the tube's axis. Primary alignment bolts 87a, 87b, are threaded into one of the mounting components, and axially fixed in rotatable relationship to unthreaded holes or bushings in the other mounting component. Primary mounts 45a, 45b, may be spaced apart from their respective mount brace 47a, 47b, by means such as loading springs 61a, 61b, and locknuts, or clips 67a, 67b. Primary mirror alignment and merging of binocular images may be accomplished by turning primary alignment bolts 87a, 87b, which adjusts the longitudinal relation of primary mounts 45a, 45b, at their respective x and y axes, thereby slightly changing the reflecting angle of primary mirrors 42a, 42b.

Extensions rods 91a, 91b, of primary alignment bolts 87a, 87b, are inserted through guide hole-bushings 53a, 53b, in braces 54, 55, 56, and 47b to handles 92a, 92b. Focuser carriage 52, and moveable secondary holder-spider 49a, are attached near the front end of glide rods 68. Moveable telescope's ocular 50a is attached by a focusing means to moveable focuser carriage 52 which is parallel and adjacent an inner side of ocular side 22, and perpendicular to central secondary optical axis 34a. Moveable telescope's ocular 50a moves within an elongated focuser slot 23 in ocular side 22 of tube 21.

FIG. 3, shows an embodiment of the instant invention which utilizes twin levers 70, as a means of moving moveable telescope. Two altitude bearings 74, are attached to opposite sides of tube 21, which rests between mount cradle 78 of Dobsonian mount 76. The lower ends of twin levers 70 encircle altitude bearings 74, which serve as lever fulcra, and slide between sides of tube 21 and mount cradle 78. A bridge between upper ends of twin levers 70, serves as a lever handle 72. Twin lever arms 82, are each attached at one of their ends by pivot pins 84 to twin levers 70 on each side of tube 21, and at the other of their ends by pivot pins 84 to their respective sides of moveable primary mount brace 47a, through respective elongated primary tube slots 41. Thus, by moving the lever-handle 72, the viewer is able move the moveable telescope, and thereby adjust the interocular distance between the two telescopes.

Figure 7A:
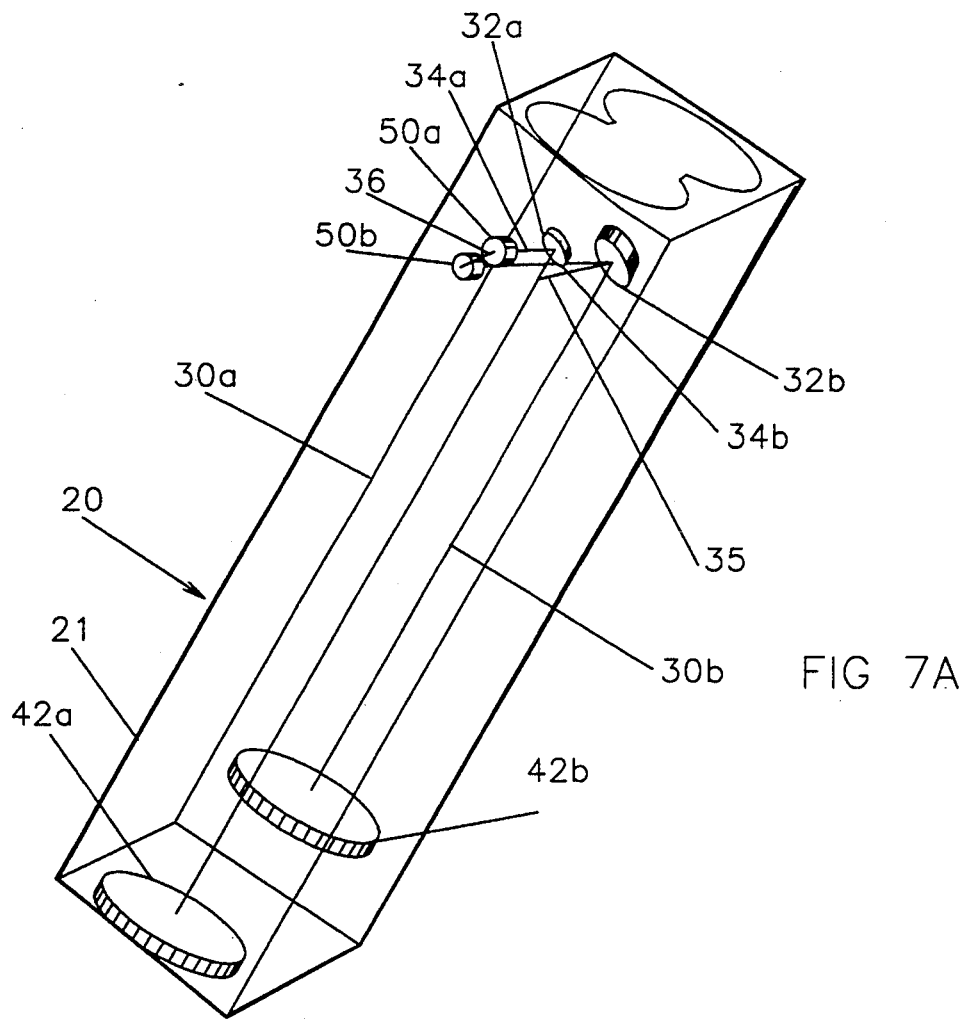
FIGS. 7A and 7B show diagrammatic perspective and front views of an embodiment of the instant invention in which the telescopes are arranged side by side in horizontal relation to one another.
Figure 7B:
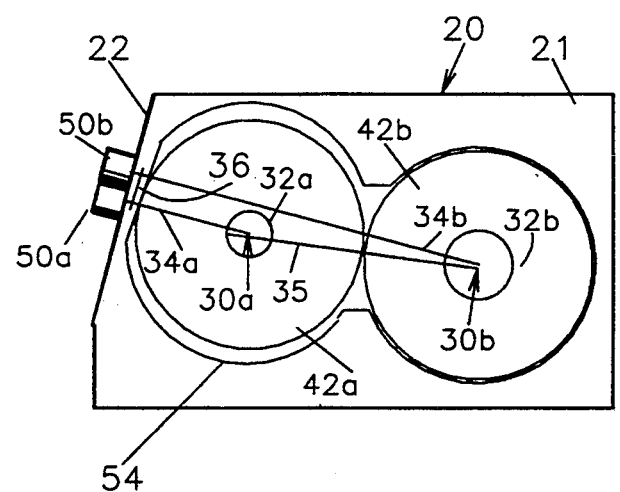

FIGS. 7A and 7B show a horizontal embodiment of the instant invention. The horizontal embodiment of the instant invention reverses the angle of interocular axis 36, the moveable telescope's secondary optical axis 34a being forward of the fixed telescope's secondary optical axis 34b. In the horizontal embodiment, the angle of interocular axis 36 changes in relation to the viewer as the attitude of the telescope changes: However, the interocular axis 36 may be so disposed as to require no more than a forty five degree tilt of the viewer's head to either side at the extreme positions of the tube. This embodiment of the instant invention is generally advantageous in the larger aperture telescopes.

Description—Operation FIGS. 2A-B, 3, 4, 5, 7A-B, 8

Incoming rays 10 from the object being viewed enter the open outer end 54 of tube 21, and are reflected by primary concave mirrors 42a, 42b, as converging primary reflected rays along central primary optical axes 30a, 30b, which in turn are intersected by plane diagonal secondary mirrors 32a, 32b, and perpendicularly reflected along parallel secondary optical axes 34a, 34b, which are so separately disposed in lateral and longitudinal relation to one another as to form a relatively comfortable outwardly sloping interocular axis 36, along a common focal plane, adjacent ocular side 22, and adjacent focuser-oculars 50a, 50b.

Interocular distance is adjusted by pushing or pulling handle 72, radially moving twin-levers 70, twin lever arms 82 translating to axial movement of the moveable telescope. Glide rods 68, are constrained by holes or bushings 53 in tube braces 54, 55, 47b, and 56, to move in a longitudinal direction. Other embodiments may translate the moveable telescope laterally.

Primary alignment adjustments are made by turning the appropriate extension rod handles 92, which turns the alignment extension rod 91 and primary alignment bolts 87a, 87b, adjusting the axis of their respective primary mirrors 42a, 42b. Images can be easily merged between the two telescopes in this manner while viewer remains at focuser ocular 50a, 50b. Alternative means of aligning the telescopes's optics include adjusting the axial angle of one or both of the telescopes within their constraints and mounts, or individually adjusting the primary and secondary mirrors in their mounts.

Summary, Ramifications and Scope

In accordance with the present invention, there is provided a single tube wherein a concave mirror, a flat reflector, and an ocular for each of two Newtonian telescopes are disposed as binoculars. The single tube allows for the secondary optical axes between the oculars and flat reflectors of the two telescopes to be disposed so as to form an a comfortable outwardly sloping interocular axis between them. Oculars are conveniently disposed adjacent a side of the tube nearest one of the telescopes, the other telescope being offset an opposite side therefrom. The instant invention is further characterized by a moveable mounting means for one telescope, and an interocular and an alignment adjusting means, both means being accessible to the viewer for adjusting interocular distances and alignment of images between the telescopes while viewing at the eyepieces.

Although the description above contains many specificities, these should not be construed as limiting the scope of the invention, but as merely providing illustrations of some of the presently preferred embodiments of this invention. For example, there are many variations of the instant invention, housing separate Newtonian telescopes in a single tube to enhance comfortable and convenient binocular viewing. Enhancements, such as motors to drive alignment and adjustment mechanisms, do not alter the instant invention. Truss tube assemblies are possible variations, as well as are laterally moveable telescopes. Thus the scope of the invention should be determined by the appended claims and their legal equivalents, rather than by the examples given.

I claim:

1. A Newtonian binocular telescope in an enclosed or truss-type single tube having a plurality of sides, and further having:
   (a) an open outer end for parallel viewing paths,
   (b) two separate inner ends wherein concave mirrors, having generally the same focal length, are disposed, their reflected rays converging along primary axes of their respective said viewing paths, toward said outer end,
   (c) wherein two flat reflectors are diagonally disposed to their respective said converging rays, directing them along perpendicular planes of parallel secondary axes,
   (d) therebeing a focus point for each said secondary axis, said focus points each intersecting an ocular adjacent a common side of said tube said side being perpendicular to said secondary axes, beyond said viewing paths,
   (e) said single tube permitting an angular disposition of said secondary axes to an axis intersecting said primary axes for a desired lateral separation of said secondary axes, so as to form a comfortable outwardly sloping interocular axis between their said focus points, a disparity of the distances between said secondary axes from said primary axes to their respective said focus points being inversely proportional to the disparity between distances to their respective said concave mirrors, whereby said Newtonian telescopes are disposed for comfortable binocular viewing at all attitudes thereof, said single tube improving their compactness, ruggedness, and accessibility to telescope mountings, especially Dobsonian mountings.

2. A Newtonian binocular telescope of claim 1, wherein at least one of said telescopes is moveable within said tube, to adjust interocular distance, respective said mirror, said reflector, and said ocular, of a fixed telescope being mounted to said tube, and of said moveable telescope being mounted to common structural members, or member, said common structural members, or member, being constrained to move along said primary axis, or along said interocular axis, of said tube, whereby said tube generally disposes both said Newtonian telescopes therein to mutual alignment.

3. A Newtonian binocular telescope of claim 2, having a lever means for moving said moveable telescope within said tube, said lever means having a fulcrum adjacent a side, or adjacent each of two opposite parallel sides, of said plurality of sides, along an axis which perpendicularly intersects said side, or said sides, a lever arm being disposed to its respective said fulcrum, adjacent said side, one end of said lever arm being disposed to said moveable telescope as a thrust means, and an opposite end thereof being disposed as a handle, whereby viewer is able to adjust interocular distance between said telescopes, while remaining at said oculars, by moving said handle, which moves said opposing thrust means, moving said moveable telescope along said primary, or said interocular, axis.

4. A Newtonian binocular telescope of claim 3, wherein said primary mirrors are attached each to a mirror mount, which has a plurality of support members each laterally extending beyond the edge of its respective said concave mirror, said support members having parallel sides facing said inner and said outer ends of said tube, therebeing a structural member of respective said telescope parallel to, and facing one of said sides of said plurality of support members, a partially threaded rod being disposed parallel to said tube's axis through each of said plurality of support members, and respective said structural member, the threaded portion thereof accepted in a threaded hole of one of said members, the unthreaded portion thereof being rotatably disposed in an axially fixed relationship to an unthreaded hole of other said member so as to adjust axial relationship of said mirror mount and attached said concave mirror adjacent said plurality of support members by turning said partially threaded rod, said partially threaded rods being extended to said outer end of said tube for access to viewer, whereby viewer is able to align binocular images between said telescopes by turning said extended partially threaded rods while viewing images in said oculars.

5. A single enclosed, or truss-type, tube for two Newtonian telescopes, having a plurality of sides and further having:
   (a) an open outer end for parallel viewing paths,
   (b) two separate inner ends wherein concave mirrors, having generally the same focal length, are disposed, their reflected rays converging along primary axes of their respective said viewing paths, toward said outer end,
   (c) wherein two flat reflectors are diagonally disposed to their respective said converging rays, directing them along perpendicular planes of parallel secondary axes,
   (d) therebeing a focus point for each said secondary axis, said focus points each intersecting an ocular adjacent a common side of said tube said side being perpendicular to said secondary axes, beyond said viewing paths,
   (e) said single tube permitting an angular disposition of said secondary axes to an axis intersecting said primary axes for a desired lateral separation of said secondary axes, so as to form a comfortable outwardly sloping interocular axis between their said focus points,
a disparity of the distances between said secondary axes from said primary axes to their respective said focus points being inversely proportional to disparity between distances to their respective said concave mirrors, whereby said Newtonian telescopes are disposed for comfortable binocular viewing at all attitudes thereof, said single tube improving their compactness, ruggedness, and accessibility to telescope mountings, especially Dobsonian mountings.

6. A Newtonian binocular telescope of claim 5, wherein at least one of said telescopes is moveable within said tube, to adjust interocular distance, respective said mirror, said reflector, and said ocular, of a fixed telescope being mounted to said tube, and of said moveable telescope being mounted to common structural members, or member, said common structural members, or member, being constrained to move along said primary axis, or along said interocular axis, of said tube, whereby said tube generally disposes both said Newtonian telescopes therein to mutual alignment.

7. A Newtonian binocular telescope of claim 6, having a lever means for moving said moveable telescope within said tube, said lever means having a fulcrum adjacent a side, or adjacent each of two opposite parallel sides, of said plurality of sides, along an axis which perpendicularly intersects said side, or said sides, a lever arm being disposed to its respective said fulcrum, adjacent said side, one end of said lever arm being disposed to said moveable telescope as a thrust means, and an opposite end thereof being disposed as a handle, whereby viewer is able to adjust interocular distance between said telescopes, while remaining at said oculars, by moving said handle, which moves said opposing thrust means, moving said moveable telescope along said primary, or said interocular, axis.

8. A Newtonian binocular telescope tube of claim 7, wherein said primary mirrors are attached each to a mirror mount, which has a plurality of support members each laterally extending beyond the edge of its respective said concave mirror, said support members having parallel sides facing said inner and said outer ends of said tube, therebeing a structural member of respective said telescope parallel to, and facing one of said sides of said plurality of support members, a partially threaded rod being disposed parallel to said tube's axis through each of said plurality of support members, and respective said structural member, the threaded portion thereof accepted in a threaded hole of one of said members, the unthreaded portion thereof being rotatably disposed in an axially fixed relationship to an unthreaded hole of other said member so as to adjust axial relationship of said mirror mount and attached said concave mirror adjacent said plurality of support members by turning said partially threaded rod, said partially threaded rods being extended to said outer end of said tube for access to viewer, whereby viewer is able to align binocular images between said telescopes by turning said extended partially threaded rods while viewing images in said oculars.

9. A Newtonian binocular telescope in a single tube, having a plurality of sides, an open outer end for parallel viewing paths, two separate inner ends wherein concave mirrors having the same focal lengths are disposed, two flat reflectors disposed adjacent said outer end, perpendicularly reflecting converging rays of light from their respective said concave mirrors along parallel secondary axes, therebeing focus points for each said secondary axis, each said focus point intersecting a common perpendicular plane beyond said viewing paths, said single tube permitting said secondary axes to be angularly disposed to an axis intersecting said primary axes so as to form the desired lateral separation between said secondary axes for a comfortable outwardly sloping interocular axis, adjacent oculars, whereby said oculars are disposed for comfortable binocular viewing in all attitudes of the telescope, said single tube providing common structural members for interocular adjustment means, binocular alignment means and for mounting means to telescope mountings.

* * * * *